United States Patent
Blach et al.

(10) Patent No.: US 8,706,591 B2
(45) Date of Patent: *Apr. 22, 2014

(54) EVENT PARTICIPATION

(76) Inventors: Edward L. Blach, Monument, CO (US); James R. Chiapetta, Delano, MN (US)

(*) Notice: Subject to any disclaimer, the term of this patent is extended or adjusted under 35 U.S.C. 154(b) by 283 days.

This patent is subject to a terminal disclaimer.

(21) Appl. No.: 13/207,636

(22) Filed: Aug. 11, 2011

(65) Prior Publication Data

US 2011/0302007 A1 Dec. 8, 2011

Related U.S. Application Data

(63) Continuation of application No. 11/007,448, filed on Dec. 7, 2004, now Pat. No. 8,001,023.

(60) Provisional application No. 60/533,208, filed on Dec. 30, 2003.

(51) Int. Cl.
*G06Q 40/00* (2012.01)

(52) U.S. Cl.
USPC .......................................................... 705/35

(58) Field of Classification Search
USPC ........................................ 705/16, 25–27, 35
See application file for complete search history.

(56) References Cited

U.S. PATENT DOCUMENTS

| | | | |
|---|---|---|---|
| 5,809,484 A | 9/1998 | Mottola et al. | |
| 6,012,925 A | 1/2000 | Kelly et al. | |
| 6,112,188 A | 8/2000 | Hartnett | |
| 6,134,536 A | 10/2000 | Shepherd | |
| 6,418,419 B1 | 7/2002 | Nieboer et al. | |
| 2002/0077961 A1 | 6/2002 | Eckert et al. | |
| 2002/0091767 A1 | 7/2002 | Munson | |
| 2002/0138300 A1 | 9/2002 | Hart et al. | |
| 2003/0018571 A1 | 1/2003 | Eckert et al. | |
| 2003/0097307 A1 | 5/2003 | Greene | |
| 2004/0078314 A1 | 4/2004 | Maerz et al. | |
| 2004/0210507 A1 | 10/2004 | Asher et al. | |
| 2004/0220827 A1 | 11/2004 | Ansel et al. | |

OTHER PUBLICATIONS

Aline Sullivan, "Share the Horse and the Handicap Recession and War Have Trimmed Prices on Racing Stock," 2 edition, International Herald Tribune. Paris: Nov. 21, 1992. p. 17.
Bev Norwood, "Backing a Tour Pro," http://www.businessweek.com/magazine/content/05_22b3935134.htm, 3 pgs. (May 30, 2005).
"Kentucky Derby Halters to be Auctioned for Charity," http://www.thoroughbredtimes.com/search/searchdetail.asp?Section=&RecordNo=54366, 1 pg. (Apr. 30, 2005).
"SuperbowlOption.com," http://www.superbowloption.com, 4 pgs. (Feb. 2005).

*Primary Examiner* — Hani M Kazimi
(74) *Attorney, Agent, or Firm* — Brooks, Cameron & Huebsch, PLLC

(57) ABSTRACT

Methods, devices and systems are provided for event participation. One method embodiment includes a method for generating income for an owner of an entrant to an event. The method includes defining the event by the owner. The method further includes offering remuneration based upon a fulfillment of the defined event. The remuneration can be memorialized by a remuneration right. The remuneration can be granted from the owner to a participant. And, the remuneration right is granted in exchange for the participant accepting to give consideration to the owner for receiving the remuneration.

23 Claims, 3 Drawing Sheets

EVENT PARTICIPATION

INTRODUCTION

This application is a Continuation of U.S. application Ser. No. 11/007,448, filed Dec. 7, 2004, which claims the benefit of U.S. Provisional Application No. 60/533,208, filed Dec. 30, 2003, the entire content of which is incorporated herein by reference.

Hobbyist and sports enthusiast often develop a certain affinity or loyalty to contestants, entrants, and/or objects connected to various events. For example, in NASCAR auto racing race fans often pull for a particular driver or car; in thoroughbred horse racing, spectators often place wagers on and pull for particular horses; in the collectibles, antiques, and auction markets collectors and/or art patrons follow the bidding and sale of objects of art or other types of collection pieces; and in the NFL football fans follow the success of their favorite team in hopes that their team may win the Superbowl. Often the volume of interest in the above described activities or events is dependent upon the degree to which the hobbyist or sport enthusiast feels connected to or invested in the particular event.

Capital expenditures are involved with holding the above described events. One form of capital expenditure involves the money invested by an equity owner to field an entrant in an event, whether the entrant is a sports team in a sporting event, a culinary preparation at a food competition, or an antique item in an antique auction, just to give a few examples. The sum of money invested in certain events can be quite significant. Typically, the amount of investment is so large that a majority of the public does not possess the financial resources to participate in the role of an equity owner. Those entities, syndicates, and/or individuals that do have such financial resources to serve as equity owners often make the capital investment needed, at least in part, with the prospect or expectation of realizing a return on the investment. That is, events such as the sale of a collectible or the entrance in a sporting competition will typically have a potential financial gain associated with the outcome of the event.

DETAILED DESCRIPTION

Figure 1:
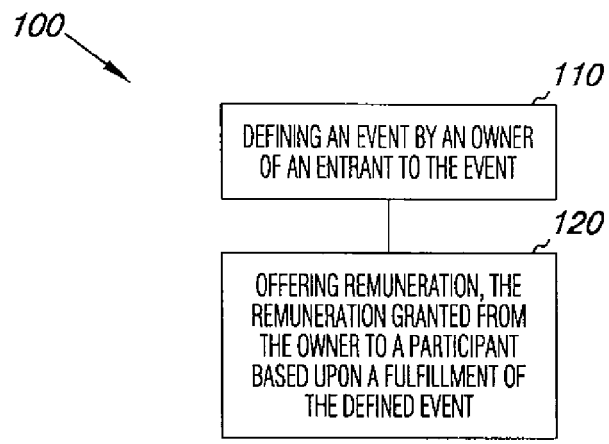
FIG. 1 is a flow chart diagram illustrating a method embodiment.

The present invention is directed to novel methods for generating revenue for an owner of an entrant to an event, raising funds for competing entities and/or generating a public audience's interest in events by providing remuneration according to a set of business rules to a public participant. Various embodiments can provide for a more intimate involvement in an event by public participants than is afforded by traditional fan participation. In addition to being a means for providing financial support to owners of competitors in an event the method provides owners a way to spread the cost/risk of investment associated with an event by generating revenue from non-traditional sources. In addition to the benefits to the owners and public participants, the invention can benefit the event itself by increasing the base of support for the event among the public and increase retailing opportunities connected with various events. Various embodiments of the invention can facilitate an increase in the fan base of an event or revenues for the industries surrounding an event. In some respects, a participant may take a psychological "ownership" in the event and become more intimate with the occurrence and outcome of the event.

As used herein, the term "owner" may include individuals, agents working on behalf of an owner, official representatives, organizations, an ownership group (e.g., a syndicate, limited partnership, limited liability company, etc.), and a minority and/or majority equity owner of an entrant (e.g., asset, competing entity, or otherwise), among others, that is, or is authorized, to act on behalf of a party having legal right, title or interest in the entrant or prizes, awards, purses, recognition or benefit, etc. paid to the entrant for competing in an event.

An "entrant", as used herein, can include an asset such as a sports team franchise, horse in an equine event (e.g., a horse racing, jumping, steeple chasing, dressage or other showing event, etc.), a car entered in an automobile event (e.g., NASCAR race, Indy 500, monster truck, motorcycling, etc.), an amateur sports team (e.g., hockey, football, baseball, basketball, soccer, etc.), an athletic contender for the Olympics (e.g., gymnast, swimmer, skater, etc.), an object of art, and/or an antique item, among others. Embodiments of the invention, however, are not limited to these examples.

To further illustrate, an "entrant" can refer to a competitor in an event whether the competitor is an individual person, an individual animal, a team of persons or animals; or an object such as an automobile, robot, item in a sale, or groupings thereof. Accordingly, as introduced above, the term "entrant" can include, for example, a horse entered into a horse race, jumping competition, Olympic event, polo match, horse auction, etc.; amateur or professional football, hockey, baseball, basketball, cricket, jai lai, lacrosse, soccer, etc., team; race car entered into a racing competition (e.g., NASCAR, Indy 500, drag racing), or other competition (e.g., monster truck, motorcycling, motocross); etc.

As used herein, the term "event" includes, without limitation: a solo sports contest where an individual is the entrant (eg. horse racing, automobile racing, golf tournament); downhill skiing, water skiing, swimming, tennis, etc.); a team sports contest (eg. football, baseball, basketball, hockey, soccer, etc.); an auction (eg. horse, automobile, art, antique, etc.); or other similar event that will be understood upon reading of the present invention.

The term "event" can further includes a defined portion or grouping of events such as a grouping of sports contests or other events. For example, an event can include a single competition such as a football game and a series of events such as a selected number of football games in a football season. An event can also include a portion of a single competition such as the first half or first quarter of a football game, or the first five innings of a baseball game, etc. Likewise, an event includes a single horse race and a series of events can include a series of horse races (e.g., the Triple Crown, Claiming Crown, all Grade I stakes for a season, etc.). As a further example, an event can include a single automobile race and a series of races in an automobile racing series or racing season, (e.g., the previous NASCAR Winston Cup Auto Racing Series). Once again, embodiments of the invention, however, are not limited to these examples. Other events not specifically stated herein but within the scope of the invention will be apparent after reading this disclosure.

As used herein, "defining an event" can include selecting a particular event and/or series of events as well as establishing particular conditions for a fulfillment of the event, e.g., prescribing conditions of fulfillment on a particular outcome or result of the event. As used herein, "fulfillment of an event" refers to the completion of the event in a manner that fulfills the conditions necessary for the entrant to transfer the remuneration to the participant. Thus, by way of example and not by way of limitation, defining an event can include selecting a particular horse race, auto race, sporting competition, etc., and the conditions for fulfillment of the event can include completion of an event by an entrant such as a horse running in the horse race, a race car competing an automobile race, etc. Fulfillment of the event can even further prescribe a completion of the event in a certain place of finish, e.g, first place, top three finishers, and/or completion of the event within a particular time frame (eg. a six furlong horse race in less than 1:09 min) or by a particular margin of victory (eg. a 20 point spread in a football game). Embodiments of the invention, however, are not limited to these examples.

A "participant", as used in this application, can be any member of the public at large or any smaller subset thereof As will be explained in more detail below, a participant pays consideration or accepts to pay consideration to an owner in exchange for receiving a remuneration that may be memorialized by a remuneration right.

As used herein, the term "remuneration right" means the right of a participant to receive "remuneration" comprising something of commercial, emotional, sentimental or other value, upon fulfillment of the event by an entrant. Thus, the remuneration associated with a remuneration right includes, for example, the right to some or all of the prize money earned by the entrant in the event, a future breeding right to a race horse or other animal competitor, an item used by the entrant during the event (e.g., a horse shoe, steering wheel, jersey, helmet, shoe, etc.). The remuneration associated with the remuneration right can also include a right to various memorabilia of the event (e.g., an autographed photograph of the entrant, a photo of the event, a commemorative ring, a collectible figurine, etc.). Thus, for example, the remuneration right may entitle the participant to some portion of a purse to be paid to a race horse for completing a particular race. The portion paid to the participant, according to one embodiment, can be a percentage portion of the prize or earnings received by the owner for the entrant's fulfillment of the event. Additionally, the remuneration right may entitle the participant to receive memorabilia, as described above, regardless of the outcome or fulfillment of the event by the entrant.

As used herein, "fulfilling the remuneration right" includes providing the benefit of the remuneration right, such as prize money, memorabilia, breeding right, etc, to the participant.

As stated above, the owner can make the remuneration available to the participant by offering the remuneration to the participant in exchange for acceptance by agreement of the participant to provide consideration to the owner for the remuneration. The remuneration can be granted in the form of a right held by the participant until fulfillment of the event. The right can be memorialized by issuance of "shares", redeemable coupons, written contract, etc. In one embodiment, a new unit of memorialization can be used that has a new name and memorializes a right held as a result of the method of the invention.

In various embodiments, shares can be issued to memorialize the remuneration right granted. The remuneration rights can be split among different participants. And, an owner may condition the issuance of shares on receiving consideration for all of the shares offered in a given pool at a fixed price and/or by auction. Other forms of consideration will be apparent to those skilled in the art after reading the present disclosure and these other forms are included within the scope of the invention. The number of shares to be issued, number of participants, type of offering, or other condition can be controlled by the owner. In addition, the owner can control whether the price of the shares is fixed, determined by auction, or other means. In the event that the shares are offered by auction, in addition to traditional auctions, it will be appreciated that the shares can also be offered through some type of electronic auction such as the well known eBay.

FIG. 1 illustrates an embodiment of a method for generating income for an owner of an entrant to an event. As illustrated in FIG. 1, the method includes defining the event by the owner in block 110. Defining the event includes defining the event as has been described above. Thus, for example, defining the event can include defining a completion of the event. The particular completion can be a certain placing at the finish and/or the particular completion can be a certain time to finish an event or a particular spread/margin of victory at the completion of the event. In some examples, defining the completion of the event can include requiring a first place finish in the event.

In block 120, the method further includes offering remuneration. The remuneration can be granted from the owner to a participant based upon a fulfillment of the defined event, as the same has been described above. The remuneration can be granted in exchange for the participant accepting to give consideration to the owner for receiving the remuneration. The remuneration can entitle the participant to a percentage of a prize awarded to the owner of the entrant for fulfilling the defined event. In various embodiments the remuneration is memorialized in the form of shares issued by the owner.

In various embodiments, the defined event is a horse race and the remuneration can entitle the participant to a photographed finish of the horse race. The photograph can be signed by a jockey of the particular horse. In various embodiments, the remuneration can entitle the participant to a breeding right when the race horse goes to stud.

In the various embodiments, the method further includes fulfilling the defined event and fulfilling the remuneration right by providing remuneration to the participant.

Figure 2:
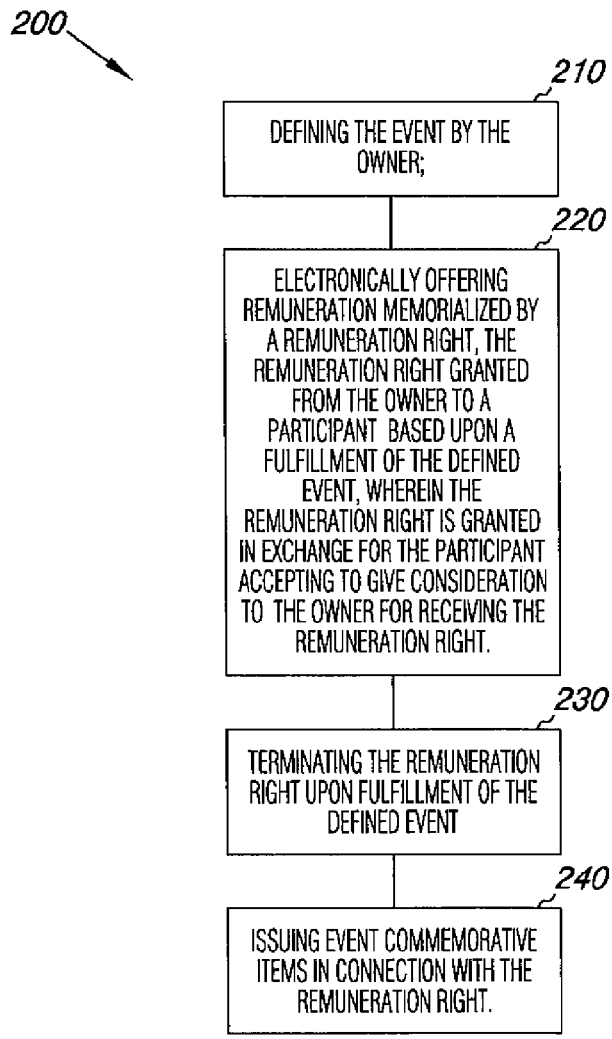
FIG. 2 is a flow chart diagram illustrating another method embodiment.

FIG. 2 illustrates a method embodiment for providing remuneration rights to a participant for a defined event upon a defined completion of the event by an entrant. As shown in FIG. 2 the method includes defining the event by the owner in block 210. Defining the event by the owner can include defining the event as the same has been described above. In block 220 the method includes electronically offering remuneration memorialized by a remuneration right. According to various embodiments, the remuneration right can include electronically offering the shares at a fixed price. According to various embodiments, the method can further include publicly auctioning the shares over the Internet.

The remuneration right can be granted from the owner to a participant based upon a fulfillment of the defined event. The remuneration right can be granted in exchange for the participant accepting to give consideration to the owner for receiving the remuneration right. As shown in block 230, the method includes terminating the remuneration right upon fulfillment of the defined event. And, the method further includes issuing event commemorative items in connection with the remuneration right, as shown in block 240.

By way of illustration and not by way of limitation, several examples are provided to illustrate the above introduced methods. As a first example, an owner of an entrant to an event offers remuneration rights represented by a fixed number of shares. The owner can be the owner of a horse, for example, Secretariat, and the event can be the Kentucky Derby. According to one method embodiment, an owner may decide that if the entrant, Secretariat wins, places, or shows in the horse race, e.g., finishes in first, second, or third place, then the owner will award a certain percentage, e.g., 10% of the purse money, e.g., remuneration, associated with the entrant's finish to public participants. In this manner, the owner has defined the event according to the method embodiment.

Further by way of example, the owner can offer the remuneration in the form of 1000 shares which can be purchased at a fixed price of $10/share. According to the method the public participants will be those members of the public who purchase the 1000 shares at $10/share. In various embodiments the owner can condition the offering on selling all 1000 offered shares. In this manner the owner has offered remuneration memorialized by a remuneration right, e.g., shares, where the remuneration right is granted from the owner to a participant based upon a fulfillment of the defined event, e.g., win, place, or show. And further, the remuneration right is granted in exchange for the participant accepting to give consideration to the owner for receiving the remuneration right. In addition, the remuneration right may entitle the participant to remuneration which is not dependent on a fulfillment of the defined event. For example, according to various methods, the owner can send the shareholders photos of the finish of the race autographed by the owner and the jockey. Other examples of remuneration associated with the remuneration right which is not dependent on the fulfillment of the defined event can include a limited edition cast figurine of the horse or a limited edition commemorative cast mint of some sort. Embodiments of the invention, however, are not limited to these examples.

As a variant to this embodiment, the owner may again decide that if the entrant, Secretariat wins, places, or shows in the horse race, e.g., finishes in first, second, or third place, then the owner will award a certain percentage, e.g., 10% of the purse money, e.g., remuneration, associated with the entrant's finish to public participants. In this manner, the owner has once again defined the event according to the method embodiment.

However, in this difference of the embodiment, the owner can offer the remuneration in the form of 1000 shares which can be purchased at auction. According to the method the public participants will be those members of the public who purchase the 1000 shares at auction. In various embodiments the owner can again condition the offering on selling all 1000 offered shares. In various embodiments, the shares can be auctioned electronically over the Internet through an Internet auction site, e.g., an auction site such as that managed by eBay. In this manner the owner has offered remuneration memorialized by a remuneration right, e.g., shares, where the remuneration right is granted from the owner to a participant based upon a fulfillment of the defined event, e.g., win, place, or show. And further, the remuneration right is granted in exchange for the participant accepting to give consideration to the owner for receiving the remuneration right.

In various embodiments the terms of the auction can be defined on the auction site and additional business rules provided by the auction site. In various embodiments each share will entitle the winning bidding entity, e.g., participant, to a 0.1% share of the horse's winnings. The shares can be auctioned to 1000 separate bidders such that each bidding entity, e.g., participant, is entitled to one share. In various embodiments, appropriate consideration will be transmitted to the website, its representatives, or the owner by the participant, and the remuneration associated with the remuneration right can be distributed in appropriate percentages to the host of the auction site, the participant, etc. Likewise, as previously, the remuneration right may entitle the participant to remuneration, as described above, which is not dependent on a fulfillment of the defined event. Further examples of the remuneration can include a breeding right when the horse goes to stud.

In various embodiments the remuneration right can be handled as a form of temporal ownership, which can include a legal, physical transfer of a portion of the title until the remuneration right is terminated, or can be a less tangible psychological ownership interest in the horse.

In various embodiments the remuneration right can be memorialized by a new memorialization mode having a new name (e.g., fanciful, descriptive or otherwise) which indicates a right obtained according to the method of the invention. For example, the remuneration right may be referred to as a "JED" or "Onapart" or other tag or label. According to the various embodiments, the offer of the remuneration right can be conducted directly by the owner and/or through an agent, representative, or other organization on behalf of the owner of the entrant or other party holding the right to receive the remuneration or remuneration right offered to a participant.

In a further variant of the embodiment, the owner may define the event as a series of events such that if the entrant, Secretariat wins, places, or shows in a certain number or in each horse race in a series of horse races, then the owner will award a certain percentage, e.g., 10% of the purse money, e.g., remuneration, associated with the entrant's finishes to public participants. Further, in various embodiments, an owner of an entrant may select to award some type of permanent ownership or shares in an entrant, as remuneration associated with a remuneration right, to a participant who successfully bids for remuneration rights in a selected number of pre-definable, possibly consecutive bids. In other words, the owner may pre-define that after six consecutive successful bids by one participant in a single entrant, then the successful participant will receive special rights, such as the aforementioned breeding, tickets to an upcoming event, or some form of permanent ownership interest. As one of ordinary skill in the art will appreciate this methodology can provide incentive for higher bidding in the auction and/or fixed price remuneration right examples. As a further variant, the owner, as defined herein, can track a number and monetary value of purchases associated with the entrant in the event by a participant, and allocate a number of basis points to the participant based on the number and monetary value of purchases made by the participant. In this example, the owner can select to allocate shares in the remuneration right to the participant according to the number of basis points accumulated by a particular participant. In all of these examples, the owner has once again defined the event and offered a remuneration right according to the method embodiment. As defined above, in various embodiments the owner can be owner is a minority shareholder of the entrant, an LLC, a syndicate, etc., and the remuneration right can be offered by an offering agency on behalf of the owner.

As another example of the introduced method embodiments, the owner can be the owner of a race car, for example, the Penzoil car of the Penzoil racing team, and the event can be a NASCAR auto race such as the Daytona 500 Race in Talledaga, Fla. According to one method embodiment, an owner, as the same has been defined herein, may decide that if the entrant, the Penzoil car, finishes in first, second, or third place then the owner will award a certain percentage, e.g., 10% or any other selectable percentage, of the purse money, e.g., remuneration, associated with the entrant's finish to public participants. In this manner, the owner has defined the event according to the method embodiment.

Further by way of example, the owner can offer the remuneration in the form of 1000 shares which can be purchased at a fixed price, e.g., $10/share as described above or any other selectable fixed price. According to the method the public participants will be those members of the public who purchase the 1000 shares at the fixed price. As in previously mentioned embodiments the owner can condition the offering on selling all 1000 offered shares. Once again in this example the owner has offered remuneration memorialized by a remuneration right, e.g., shares, where the remuneration right is granted from the owner to a participant based upon a fulfillment of the defined event, e.g., finishing the auto race in first, second, or third place. The remuneration right is granted in exchange for the participant accepting to give consideration to the owner for receiving the remuneration right. In addition, the remuneration right may entitle the participant to remuneration which is not dependent on a fulfillment of the defined event. For example, according to various methods, the remuneration right may entitle the participant to an article from the particular race car and/or article from the driver of the race car upon completion of the NASCAR race. By way of example and not by way of limitation, the example articles can include a tire removed from the particular race car, a seatbelt or portion thereof from the race car, a fender from the race car, the race car driver's helmet, etc. Other examples of remuneration associated with the remuneration right can include photos of the auto race, including the finish photo, photos of the race car and driver, which can be autographed by the owner and the driver, etc. Other examples of remuneration associated with the remuneration right which is not dependent on the fulfillment of the defined event can include a limited edition cast figurine of the entrant, a photograph of the event, a piece of jewelry commemorating the event, etc. Embodiments of the invention, however, are not limited to these examples.

As described above, a variant to this method embodiment includes the owner deciding that if the entrant, the Penzoil car Secretariat finishes in first, second, or third place then the owner will award a certain percentage, e.g., 10% of the race prize money, e.g., remuneration, associated with the car's finish to public participants. In this manner, the owner has once again defined the event according to the method embodiment.

However, in this difference of the embodiment owner can offer the remuneration in the form of 1000 shares which can be purchased at auction. According to the method the public participants will be those members of the public who purchase the 1000 shares at auction. In various embodiments the owner can again condition the offering on selling all 1000 offered shares. In various embodiments, the shares can be auctioned electronically over the Internet through an Internet auction site according to the various embodiments described above.

That is, in various embodiments the terms of the auction can be defined on the auction site and additional business rules provided by the auction site. In various embodiments each share will entitle winning bidding entity, e.g., participant, to a 0.1% share of the owner's winnings. The shares can be auctioned to 1000 separate bidders such that each bidding entity, e.g., participant, is entitled to one share. Alternatively, the 1000 shares can be auctioned in blocks with more than one share granted to the winning bidding entities. Alternatively, all 1000 shares can be granted or to the highest bidding entity. Embodiments of the invention are not so limited. In various embodiments, appropriate consideration can be transmitted to the website or its representatives by the participant, or high bidder, and the remuneration associated with the remuneration right can be distributed in appropriate percentages to the host of the auction site, the owner of the Penzoil car, etc. Alternatively, the owner can distribute the remuneration associated with the remuneration right, via electronic funds transfer or other means, directly to the participants and a service or handling fee can be distributed to the auction site.

As described above in various embodiments the owner may define the event as a series of events such that if the entrant, the Penzoil race car finishes in first, second, or third place in a certain number of auto races in a series, e.g., the previously referred to Winston Cup Series, or alternatively finishes in first place a the top of the winnings rank at the conclusion to a season of the Winston Cup Series, then the owner will award a certain percentage, e.g., 10% of the Series prize money, e.g., remuneration, associated with the Penzoil car's finishes to public participants. In this manner, the owner has once again defined the event according to the method embodiment.

As yet another example of the introduced method embodiments, the owner can be the owner of a professional sports team franchise. In these examples, the entrant is the sports team. However, embodiments are not so limited and the entrant can also include a particular player and/or group of players on a particular sports team. As one of ordinary skill in the art will appreciate upon reading this disclosure the sports team can include an NFL football team, a major league baseball team, an NHL hockey team, a professional golfer in the PGA, an amateur sports team, etc. Again, embodiments are not limited to these examples. To take the example of an NFL football team (e.g., the Washington Redskins), the owner, as the same has been described above (e.g., minority, majority, syndicate, partnership entity or otherwise) can define an event such as winning a particular football game such as a season match up between the Washington Redskins and the Dallas Cowboys, winning a collection or grouping of particular football games in the season for the Washington Redskins, the Redskins making the playoffs, and/or winning the Super Bowl. In this manner, the owner has defined the event according to the method embodiment.

The owner can further decide to award a certain remuneration associated with a remuneration right upon a fulfillment of the owner defined event to public participants. As described in the above examples, the owner can memorialize the remuneration in the form of shares which can be purchased at a fixed price and/or auctioned. By way of illustration and not by way of limitation, the owner of a football team can define an event as a completion of the football season, regardless of the team's finish in the standings at the conclusion of the season. Additionally, the owner can offer remuneration associated with a remuneration right, memorialized by shares or otherwise as follows. The owner can decide to auction the helmets of his or her players, as remuneration associated with remuneration right, before a season starts. For example, the owner of the Denver Broncos can decide to auction the rights to the helmets of the 53 player team roster in August prior to the commencement of the season.

The 53 successful bidders, e.g., participants, (one helmet per bidding entity, although embodiments are not so limited to this example) will be particularly interested to follow the Broncos football season, possibly purchasing more tickets to games, memorabilia and/or other team apparel, in anticipation that the better the Bronco perform over the course of the season, then the more valuable the helmets will be after the season has finished. In other words, if the 2004/2005 Bronco team compete in and win the 2005 Super Bowl, then the 53 bidders will receive a helmet from one of the players (certain helmets may command a higher bid price than others) of the Bronco 2005 Super Bowl winning team, which may have considerable value to certain sports memorabilia collectors. According to the method the public participants will be those members of the public who purchase the 53 remuneration rights. As one of ordinary skill in the art will appreciate the purchase consideration received by the owner in exchange for the remuneration rights can serve to add revenues to the owner's sports club and/or can be allocated for contribution to a charitable organization such as the United Way. In either manner, the purchase consideration received by the owner in exchange for the remuneration rights bears the potential of reducing the owner's risk by increasing revenues, and increasing fan support and interest.

One of ordinary skill in the art will appreciate that the example given here can further be applied in the amateur sports team setting. For example, the athletic department of a local high school can similarly auction the helmets of its football team roster, as remuneration associated with a remuneration right, for an event defined as the conclusion of the high school football team's season. Again, fan support and associated revenues can be stimulated through such a method as team supporters follow their local high school's hopes for winning the state championship.

To give another example on a variant of the method embodiment, the owner of a soccer team, e.g., entrant, competing in a season of soccer matches, e.g., series of events, can offer remuneration associated with remuneration rights as follows. The purchase of the remuneration rights, with any particular associated remuneration, can further include the requirement for the bidder entity, e.g., potential participant, to predict the performance of the soccer team in advance, as part of the criteria for deciding whom among the participant remuneration right purchasing pool will receive remuneration at the conclusion of the defined event. In other words, once a target price is reached for the auction or sale of the remuneration rights, those who were successful in purchasing the remuneration rights will be scrutinized further by their predictions on the performance of the soccer team. For example, 100 participants, e.g., highest bidders, may purchase remuneration rights by paying $1000 each as consideration to the owner in exchange for a remuneration right. Of those 100 participants the seven who successfully predicted the team's 12-4 season record and remained tied for their position as winners of the remuneration right auction purchase and prediction format, following all other possible variations for tie breakers, will receive the remuneration as defined in the terms of the remuneration right auction. In another variant of this embodiment, the remuneration can be determined by a combination of successful bidding and achievement of a certain performance standard such as once the team wins 12 games or once one of the players achieves a certain score of finish. This can include an NFL team player breaking 1000 yards rushing in the season or other similar pinnacle achievements.

From reading these examples, one of ordinary skill in the art will appreciate the method embodiments described herein can be applied to a number of very diverse events. By way of example and not by way of limitation, other events can include a culinary contest, an art or antique auction, an agricultural event, a livestock event, a science project event, and a domesticated animal show. Further the entrants and associated events can include an Olympic hopeful athlete in an Olympic qualifying competition, a diver or swimmer in a diving or swimming meet, and a golfer in a golf tournament, among others. Embodiments of the invention are not limited to these examples.

Figure 3:
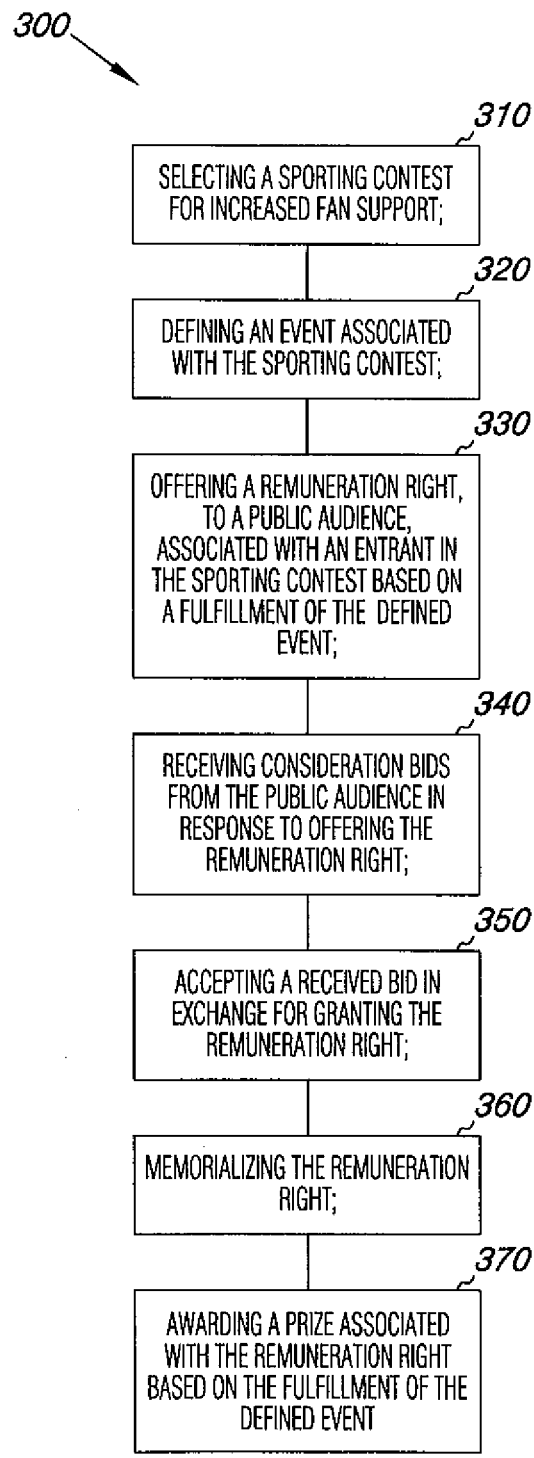
FIG. 3 is a flow chart diagram illustrating another method embodiment.

FIG. 3 illustrates a method embodiment for increasing fan support in a sporting contest. As shown in FIG. 3, the method includes selecting a sporting contest for increased fan support, as shown in block 310. In block 320 the method includes defining an event associated with the sporting contest. Defining an event includes defining an event as the same has been described above. In block 330 the method can include offering remuneration, to a public audience, associated with an entrant in the sporting contest based on a fulfillment of the defined event. The remuneration can be memorialized in the form of a share. The method further includes receiving consideration bids from the public audience in response to offering the remuneration, as shown in block 340. In block 350 the method further includes accepting a received bid in exchange for granting the remuneration right. In block 360 the method includes memorializing the remuneration right. And, in block 370, the method includes awarding a prize associated with the remuneration right based on the fulfillment of the defined event.

In various embodiments the method further includes measuring interest in the sporting contest among the public audience based on an analysis of the received consideration bids. In some embodiments this includes evaluating a change in an interest in the sporting event among the public audience based on a comparison of the measured interest against previous event offering responses, attendance at events or other method used to determine fan support of an event.

Various method embodiments can be performed by physical means, e.g., using brokers to sell shares, auction houses to conduct auctions, etc. However, one advantage to certain embodiments of the invention is the use of an electronic medium such as the Internet. Method embodiments which use the Internet can facilitate drawing participants from larger pools as well as affording participants to the ability to participate in a larger pool of remuneration right offerings. Also, various sequences of the method embodiments can be performed by physical means and others by electronic means. Additionally, the method embodiments which use an electronic medium can provide for rapid collection, storage and analysis of data, whether the data relates to information on owners, participants, events, entrants, results, bid prices, etc.

Thus, the methods described above and herein can be performed by software (e.g. computer executable instructions) operable on systems and devices shown herein or otherwise. The embodiments of the invention, however, are not limited to any particular operating environment or to software written in a particular programming language. Unless explicitly stated, the method embodiments described herein are not constrained to a particular order or sequence. Additionally, some of the described method embodiments or elements thereof can occur or be performed at the same point in time.

As illustrated above, in the various embodiments the event can be a sporting event and the entrant can be a competing entity in the sporting event. Embodiments, however, are not limited to sporting events. That is, as mentioned above, while the entrant can be a competing entity, e.g., a professional sports team franchise, the entrant can further be some other form of asset or work product, e.g., a culinary preparation, an artwork (e.g., a screen play, movie, scripts, literary work, sculpture, among others), an agricultural product (e.g., tomatoes, watermelon, and/or pumpkins, among others), livestock (e.g. hogs and cattle, among others), a science project (e.g., an entry in a new forms of solar powered vehicles contest), and a domesticated animal (e.g. a particular dog entered in the Westminster Kennel Dog Show). Embodiments of the invention are not limited to these examples.

The event can be a sporting event or otherwise where the event includes a basketball game, a national association of stock car auto racing (NASCAR) race, a hockey game, a horse race, a swim meet, a diving competition, a golf tournament, a football game, a soccer match, and/or a baseball game, among others. These examples do not provide an exhaustive list and embodiments are not limited to the examples provided.

Figure 4:
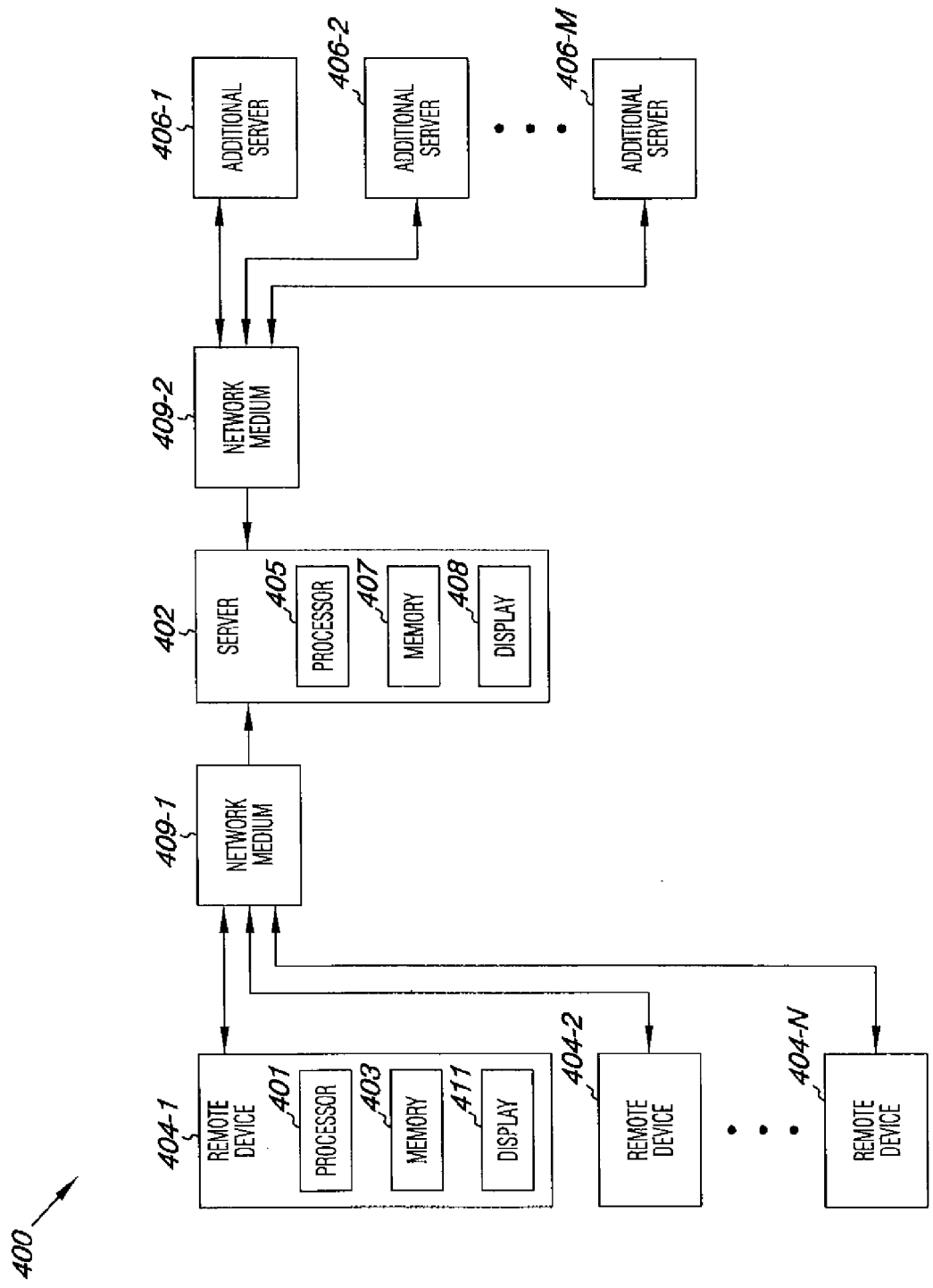
FIG. 4 illustrates an embodiment for electronic devices and computer readable medium in a computing device network.

FIG. 4 illustrates an embodiment for electronic devices and computer readable medium in a computing device network 400. The electronic devices and computer readable medium in the computing device network 400 can electronically perform the methods described herein. The embodiment of FIG. 4 illustrates a network 400 that includes an electronic computing device, e.g., server 402. The server 402 includes a processor 405 coupled to a memory and/or database, e.g., computer readable medium 407. The server 402 can further include a display 408 and one or more input/output (I/O) devices (not shown) as the same are known and understood by one of ordinary skill in the art, e.g., a mouse, keyboard, touch panel, etc. Processor 405, memory 407, and display 408 can include any type of processor, memory, and display capability in the art of computing.

As shown in the embodiment of FIG. 4, the server 402 can be connected to a number of additional electronic devices, shown as 404-1, 404-2, . . . , 404-N, such as remote computing devices. The designator "N" is intended to indicate that any number of remote devices can be connected to the server 402 over a network 400. The remote devices 404-1, 404-2, . . . , 404-N can similarly include processor 401, memory 403, and display 411 capabilities, as well as I/O devices. The server 402 and/or remote devices 404-1, 404-2, . . . , 404-N are capable of including program instructions/software (e.g., computer executable instructions) to cause a server 402 or other devices 404-1, 404-2, . . . , 404-N to perform particular functions, such as the methods described herein. As shown in the embodiment of FIG. 4, devices 404-1, 404-2, . . . , 404-N can couple to the server 402 through a network medium 409-1. The network medium 409-1 through which the devices 404-1, 404-2, . . . , 404-N can couple to the server 402 include a number of medium types. For example, the network medium 409-1 can include a local area network (LAN), e.g. an Ethernet network, a wide area network (WAN), a wireless local area network (WLAN), the public switched telephone network (PSTN), and/or the Internet using transmission control protocol/Internet protocol (TCP/IP). Embodiments of the invention are not so limited to these examples and can include combinations of these networks connecting through gateways, hubs, switches, routers, service switching points (SSPs), service control point (SCP) databases, signal transfer points (STPs), mobile switching centers (MSCs), and the like as the same are known and understood by one of ordinary skill in the art. Networks, as used herein, can include wireless networks as can be accessed by cell phones, multifunction handheld devices (PDAs and Blackberries), and the like. Wireless networks can include Global System for Mobile communications (GSM) networks and associated protocols, American National Standards Institute (ANSI) networks and associated protocols, Public Wireless Local Area Networks (PWLANs) including Wireless Fidelity (Wi-Fi) networks and associated protocols. Thus, devices described herein can be coupled in either direct hardwired fashion, e.g. using copper, coaxial cable, optical fiber connections, and hybrid fiber-coax connection, and/or indirectly in a wireless fashion using remote electromagnetic signal transmission in the radio or microwave frequencies, e.g., RF.

Network 400 illustrates that the above described components can couple to additional servers and/or computing devices, 406-1, 406-2, . . . , 406-M, over a network medium 409-2 as the same has been described above. The designator "M" is intended to indicate that any number of additional servers and/or computing devices can be connected to the server 402 in a single network or combination of networks 400. Such additional servers and/or computing devices, 406-1, 406-2, . . . , 406-M, can be maintained by other organizations, or entities. The additional servers and systems, 406-1, 406-2, . . . , 406-M, can include core databases accessible by the server 402 according to definable access rights. The additional servers and systems, 406-1, 406-2, . . . , 406-M, can include databases and executable instructions or programs to operate on data, host websites, and can possess PSTN processing and routing capabilities or other network connectivity as described above. The additional servers and systems, 406-1, 406-2, . . . , 406-M, can include proprietary databases, data modules, and software systems maintained by a third party, such as a third party Internet auction site.

The server 402, the number of remote devices 404-1, 404-2, . . . , 404-N, and the additional servers and systems, 406-1, 406-2, . . . , 406-M, can all include computer readable medium having computer-executable instructions. These computer readable medium include such devices as a disk drive for reading data storage media, e.g. a compact disc, and/or computer readable medium such as random access memory (RAM) and read only memory (ROM), non-volatile, optical, or any other type of memory storage medium.

According to embodiments of the present invention, the server 402 in network 400 can include program instructions for defining an event and offering remuneration associated with a remuneration right to one or more participants. In one embodiment, the memory 407 of the server 402 includes a database having one or more participant files. The participant file can include a remuneration right associated with one or more particular entrants connected to an event. And, as mentioned above, the remuneration rights can be electronically memorialized as shares in a participant file. The one or more participant files are displayable on a remote device, e.g., 404-1, having a graphical user interface, e.g., display 411. According to the method embodiments described above, a remote device 404-1 can be used by a potential participant to enter a bid, e.g., in an electronic auction setting, or to accept an offer for remuneration associated with a remuneration right. For example, the remote device 404-1 can be coupled on-line to the server 402 and/or can interact with a third party Internet auction site, e.g., on server 406-1 to enter a bid or to accept an offer for remuneration associated with a remuneration right.

Embodiments include a program instructions executable on the network 400 for tracking the remuneration right and tracking an outcome of the event. In various embodiments, the event includes an event selected from the group of a thoroughbred horse race, a match between two sports teams, an auto race, and an art auction. However, these examples are not exhaustive and embodiments of the invention are not limited to the same. As mentioned above, program instructions are not limited to a program written in any particular language. Nor is the program limited to any particular operating environment. Embodiments of the program instructions can record a fixed percentage of a prize, financial reward, or otherwise, associated with a fulfillment of an owner defined event, as remuneration associated with a remuneration right. As described in the methods above, the remuneration right can be electronically offered up for auction bidding or fixed price purchase in connection with an entrant in a given event. Embodiments of the program instructions can execute to allocate the remuneration right, memorializing the fixed percentage remuneration, into a number of shares. The program instructions can further execute to distribute the number of shares among appropriate participant files. In various embodiments, the program instructions can execute to issue certification, documentation, and memorabilia, which is not dependent on the fulfillment of the defined event, according to the remuneration right in a given participant file.

Thus, according to various embodiments, the network 400 includes program instructions which can execute to define an event and offer remuneration associated with a remuneration right to one or more participants. The program instructions can execute to store the remuneration rights in a database 407 of the server 402 and/or elsewhere in the network 400. As one of ordinary skill in the art will appreciate upon reading this disclosure a database having one or more participant files, as well as the program instructions described herein, can be located in one or several locations in a distributed computing device network 400. As described above, the number of remote devices, 404-1, 404-2, ..., 404-N, can similarly include program instructions which can execute to enable access the server 402 and its one or more participant files. In various embodiments, the remote devices, 404-1, 404-2, ..., 404-N, server 402, and/or additional servers, 406-1, 406-2, ..., 406-M, can include program instructions which can execute to grant access to an Internet auction site service associated with the method embodiments and to grant access to a particular participant file in the database 407 of the server 402 based on a subscription service.

In various embodiments the program instructions can execute to calculate a fixed price for a remuneration right based on a number of criteria. The number of criteria can include a market value of the entrant to an event, a set of odds associated with an outcome of the event, and/or a potential financial gain associated with the outcome of the event. The program instructions can execute to allocate the remuneration right to a participant based on the participant's involvement in a number of events according to the method embodiments described above. For example, the program instructions can execute to track a number and monetary values of one or more purchases associated with various events and record this information to an appropriate participant file. The program instructions can execute to allocate a remuneration, represented as a number of shares or otherwise, to a participant based on one or more thresholds, e.g., a certain number of purchases or a certain monetary value of those purchases being attained. Additionally, as described in the method embodiments above, the program instructions can execute to grant a remuneration right to a participant based on attaining a number of previous purchases or successful bids for purchase of remuneration rights in connections with previous events. To further illustrate, the program instructions can include a definable set of business rules which can be executed in connection with the program instructions to allocate and record a number of basis points to a participant file based on the number and monetary value of purchases associated with the participant file. The program instruction can accordingly execute to shares associated with a remuneration right to a given participant file according to the number of basis points in the given participant file.

Additionally, program instructions can execute to market additional remuneration rights associated with other related or non-related events to participants. Likewise, the program instructions can execute to market retail items associated a given event, the entrant in the event, and/or other related or non-related entrants and events. That is, the program instructions can execute to market additional event commemorative items, apparel, etc. to participants.

According to various embodiments, the program instruction provided to the network 400 can execute to track an event. That is, the program instructions can execute to receive data from additional third party sources, whether newswire and media coverage, advertising, event host organizations or otherwise, in order to process the results of an entrant in an event and perform associated action based thereon. For example, the program instructions can execute to fulfill the remuneration right by providing the remuneration associated with the remuneration right to the participant. These embodiments can include providing the remuneration via electronic fund transfer (EFT) to a bank account provided by the participant and/or providing the remuneration to an Internet auction site to handle distribution to the participant. As noted above, the terms of fulfilling the remuneration right may be established on the Internet auction site. Embodiments of the invention are not limited to these examples and one of ordinary skill in the art will appreciate other suitable means, electronically or otherwise, to fulfill the remuneration right to a participant based on a fulfillment of the defined event by an entrant to the event. Additionally, the program instructions can execute to terminate the remuneration right upon fulfillment of the remuneration right. By way of example and not by way is of limitation, this can include the program instructions executing to record the fulfillment of the remuneration right, having paid appropriate remuneration to the participant, and to record a termination of the remuneration right in the database 407 of the server.

In various method embodiments, as described above, the program instructions can execute to record an actual legal or physical transfer of an ownership interest in the entrant to a participant as part of fulfilling the remuneration right. Embodiments of the invention are not so limited. Embodiments of the invention thus include programs on computer readable mediums which are executable to cause a device to perform a method.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory computer readable medium having program instructions stored thereon and executable by a processor to direct a computing device to perform a method for increasing fan support of a sporting contest by increasing fan involvement over other members of a public audience, comprising:

utilizing the processor to execute the program instructions and receive input from a number of electronic user interfaces for:

defining an event associated with the sporting contest;

electronically offering a remuneration right from an owner of a prospective entrant in the sporting contest to members of the public audience in exchange for monetary consideration, such remuneration right being a transfer of possession of at least one item used by, earned by, acquired by, or personalized by the prospective entrant in the sporting contest, wherein the sporting contest is to be conducted in the future and in which the prospective entrant will compete;

electronically recording acceptance by a member of the public audience of the offered remuneration right, the member of the public audience becoming a fan as a result of acceptance; and electronically recording the monetary consideration received by the owner from the fan.

2. The medium of claim 1, where the remuneration right is conditioned upon completion of defined outcome in the event by the prospective entrant.

3. The medium of claim 1, wherein the method further includes:

achieving a particular outcome in the defined event by the prospective entrant; and transferring possession of the at least one item from the owner to the fan.

4. The medium of claim 1, wherein the monetary consideration is used by the owner to fund investment in the prospective entrant in the sporting event.

5. The medium of claim 1, wherein the owner is a minority shareholder of the prospective entrant.

6. The medium of claim 1, wherein the method further includes electronically offering the remuneration right by auction bidding to at least two members of the public audience over the internet.

7. The medium of claim 6, further including measuring interest in the sporting contest among the members of the public audience based on an analysis of the received auction bids.

8. The medium of claim 6, further including evaluating a change in an interest in the sporting contest among members of the public audience based on a comparison of the measured interest in the sporting contest against previous event offering responses.

9. A non-transitory computer readable medium having program instructions stored thereon and executable by a processor to direct a computing device to perform a method, comprising:

utilizing the processor to execute the program instructions and receive input from a number of electronic user interfaces for:

electronically offering a remuneration right from an owner of a prospective entrant in a sporting event to a member of the public in exchange for monetary consideration, such remuneration right being a transfer of possession of some or all of at least one item used by, earned by, acquired by, or personalized by the prospective entrant in the sporting event, wherein the sporting event is to be conducted in the future and in which the prospective entrant will compete;

conditioning such remuneration right upon achievement of a particular outcome in the sporting event by the prospective entrant;

electronically recording acceptance by the member of the public of an offered remuneration right, the member of the public becoming a participant as a result; and electronically recording transfer of the monetary consideration from the participant to the owner.

10. The medium of claim 9 wherein the electronic user interface is a computer.

11. A non-transitory computer readable medium having program instructions stored thereon and executable by a processor to direct a computing device to perform a method, comprising:

utilizing the processor to execute the program instructions and receive input from a number of electronic user interfaces for:

defining a competitive event;

electronically offering a remuneration right from an owner of an entrant in the competitive event to a member of the public in exchange for monetary consideration, such remuneration right being a transfer of possession of at least one item used by, earned by, acquired by, or personalized by the entrant in the competitive event, wherein the competitive event is to be conducted in the future and in which the entrant will compete;

electronically recording acceptance by the member of the public of the offered remuneration right, the member of the public becoming a participant as a result; and electronically recording the monetary consideration received by the owner from the participant.

12. The medium of claim 11 wherein monetary consideration of participant is accepted electronically.

13. The medium of claim 11 wherein the monetary consideration for the remuneration right is fixed.

14. The medium of claim 11, wherein the method further includes electronically offering the remuneration right to at least two members of the public over the internet.

15. The medium of claim 14, wherein the monetary consideration for the remuneration right is determined by auction bidding.

16. The medium of claim 11 wherein the entrant is an entrant in a sporting event.

17. The medium of claim 11 wherein the remuneration right is conditioned upon achievement of a particular outcome in the defined competitive event by the entrant.

18. The medium of claim 15 wherein the remuneration right is a transfer of at least a portion of the money earned by the owner for participation of the entrant in the defined competitive event.

19. The medium of claim 17, wherein the method further includes:

calculating a fixed price for the remuneration right based on a number of criteria including:

a market value of the entrant; and a potential financial gain associated with achievement of the particular defined outcome.

20. The medium of claim 11, wherein the monetary consideration is used by the owner to fund investment in the entrant.

21. The medium of claim 20, wherein the owner is a minority shareholder of the entrant.

22. The medium of claim 11 wherein the entrant is a collectible.

23. The medium of claim 11, wherein the method further includes electronically receiving the monetary consideration from the member of the public over the internet.

* * * * *